United States Patent [19]
Schorman et al.

[11] Patent Number: 6,101,175
[45] Date of Patent: Aug. 8, 2000

[54] METHOD AND APPARATUS FOR HANDOFF WITHIN A COMMUNICATION SYSTEM

[75] Inventors: Eric R. Schorman, Bedford, Tex.; Michael D. Kotzin, Buffalo Grove, Ill.

[73] Assignee: Motorola, Inc., Schaumburg, Ill.

[21] Appl. No.: 08/962,517

[22] Filed: Oct. 31, 1997

[51] Int. Cl.[7] .................................. H04J 3/06; H04L 7/00
[52] U.S. Cl. ........................ 370/331; 370/350; 375/367; 455/436
[58] Field of Search ...................................... 370/328, 331, 370/335, 342, 350, 508; 375/200, 367; 455/442, 525, 502, 13.1

[56] References Cited

U.S. PATENT DOCUMENTS

| | | | |
|---|---|---|---|
| 5,561,838 | 10/1996 | Chandos et al. | 455/13.1 |
| 5,586,119 | 12/1996 | Scribano et al. | 370/350 |
| 5,640,679 | 6/1997 | Lundquist et al. | 455/525 |
| 5,825,835 | 10/1998 | Kingston et al. | 375/367 |
| 5,828,659 | 10/1998 | Teder et al. | 370/328 |
| 5,907,813 | 5/1999 | Johnson, Jr. et al. | 455/502 |

OTHER PUBLICATIONS

"Personal Station–Base Station Compatibility Requirements for 1.8 to 2.0 GHz Code Division Multiple Access (CDMA) Personal Communication Systems" (American National Standards Institute (ANSI) J–STD–008), pp. 1–19 to 1–21, 2–54 to 2–55, 2–224 to 2–226, 3–126 to 3–131.

GSM Recommendation 05.10 pp. 1–6.

*Primary Examiner*—Hassan Kizou
*Assistant Examiner*—John Pezzlo
*Attorney, Agent, or Firm*—Kenneth A. Haas; Mario J. Donato, Jr.

[57] ABSTRACT

In a communication system (100) where a remote unit is given a time offset for a base station (102) and hands off to the base station (102) if the remote unit (113) can acquire the base station within a time window surrounding the time offset, a remote unit (113) utilizes the time offset of each base station (supplied by a serving base station (101) via a downlink communication signal (116) and searches for neighboring base stations within the time window surrounding its PN offset. The time window surrounding an individual base station's PN offset is allowed to vary depending upon whether the communication system (100) is time synchronized. In particular, a base station (101) supplies the remote unit (113) with an indication that the communication system (100) is operating in a synchronized or an unsynchronized mode, and the remote unit (113) varies the time window (search window) accordingly.

10 Claims, 4 Drawing Sheets

METHOD AND APPARATUS FOR HANDOFF WITHIN A COMMUNICATION SYSTEM

FIELD OF THE INVENTION

The present invention relates generally to cellular communication systems and, in particular, to handoff within cellular communication systems.

BACKGROUND OF THE INVENTION

Existing direct sequence spread spectrum cellular communication system protocols require base stations within the communication system to be time synchronized. For example, within a wireless communication system utilizing a Code Division Multiple Access (CDMA) system protocol, it is desirable to have all base stations within the communication system synchronized to +/–3 microseconds ($\mu s$), and it is mandatory that all base stations within the communication system be synchronized to at least to +/–10 $\mu s$. Synchronization occurs within a CDMA system as described in "Personal Station-Base Station Compatibility Requirements for 1.8 to 2.0 GHz Code Division Multiple Access (CDMA) Personal Communication Systems" (ANSI J-STD-008). In particular, all base stations reference a common CDMA system-wide time scale that uses Global Positioning System (GPS) time. All base stations utilize the same pseudo-noise (PN) spreading code, but with different time offsets. A remote unit uses a correlator to detect the presence of the PN code, and will detect all base stations in the geographic region if it searches the entire length of the single PN. In the described system, the base stations are offset from each other by integer multiples of 64 PN chips, thus allowing 512 unique offsets of the length $2^{15}$ or 32,768 chips. The base station which is in communication with a remote unit communicates the PN (time) offset of each neighboring base station which the remote unit should search. A major advantage in having all base stations within a communication system utilize a common system time, is that during handoff between base stations, a remote unit only need to look within a very small time window around the nominal PN offset to acquire a new base station.

In order to reduce system costs, some current CDMA developers are proposing that base stations within next-generation CDMA systems be unsynchronized. An example of an unsynchronized next-generation CDMA system is that proposed in "Coherent DS-CDMA: Promising Multiple Access For Wireless Multimedia Mobile Communications", F. Adachi, M. Sawahashi, T.Dohi, and K.Ohno, ISSSTA 1996, Mainz, Germany. In this proposal, each base station has a unique long code and a common short code. The base primarily transmits a product of the two codes, but at defined times will mask the long code and transmit only the short code. Thus a remote unit may search for the common short code and get a periodic strong match from a strong base station, and a periodic weaker match from a weaker base station. The proposal describes a process for the mobile to first detect short codes, then determine the long code timing, a long code group identification, and then the long code identification. A mobile in communication with one base station must continually search for the presence of nearby base stations using this same process, since base stations are unsynchronized and cannot communicate timing information to the remote units to reduce their search. Because of this, remote units handing off within an unsynchronized system will need to look within a larger time window to acquire a new base station. Since there currently exists no method to determine whether a communication system is synchronized or not, remote units handing off within next-generation CDMA systems will be required to search a larger time window when handing off, even if the base stations are time synchronized, resulting in unnecessarily long handoff times.

It is desirable to have synchronized base stations for fast handoff, yet allow the system to operate in geographic areas where accurate time synchronization is unavailable, or continue to operate when time synchronization fails. Therefore, a need exists for a method and apparatus for determining if a communication system is synchronized and adjusting a search window accordingly during handoff.

BRIEF DESCRIPTION OF THE INVENTION

DETAILED DESCRIPTION OF THE DRAWINGS

Figure 1:
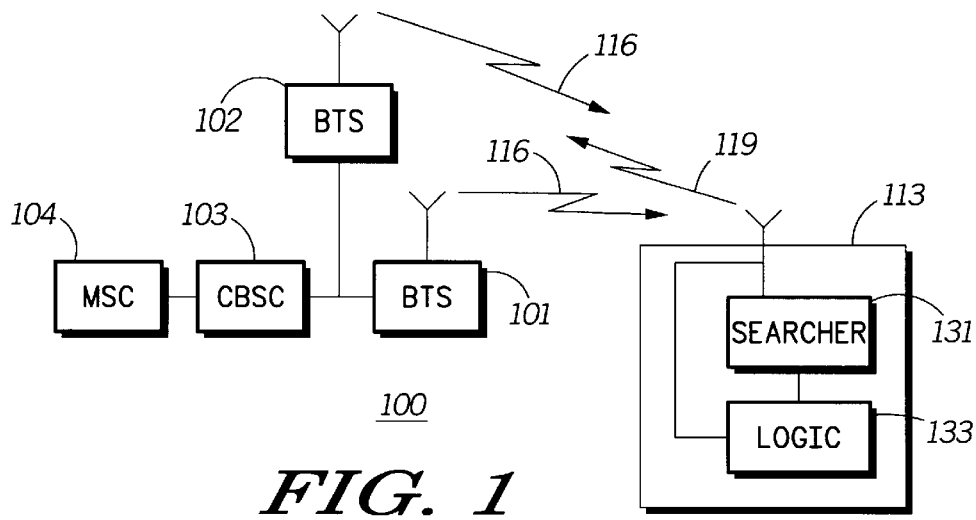
FIG. 1 illustrates a wireless communication system in accordance with the preferred embodiment of the present invention.

Stated generally, in a communication system where a remote unit is given a time offset for a base station and hands off to the base station if the remote unit can acquire the base station within a time window surrounding the time offset, a remote unit utilizes the time offset of each base station (supplied by a serving base station via a downlink communication signal) and searches for neighboring base stations within the time window surrounding its PN offset. The time window surrounding an individual base station's PN offset is allowed to vary depending upon whether the communication system is time synchronized. In particular, a base station supplies the remote unit with an indication that the communication system is operating in a synchronized or an unsynchronized mode, and the remote unit varies the time window (search window) accordingly. Because remote units acquiring base stations vary their search window based on the communication system synchronization status, remote units will search smaller time windows when handing off, resulting in faster acquisition times and consequently faster handoffs.

The present invention encompasses a method to facilitate handoff in a communication system where a remote unit is given a time offset for a base station and hands off to the base station if the remote unit can acquire the base station within a time window surrounding the time offset. The method comprises the steps of determining if the communication system is operating in a synchronized or an unsynchronized mode and adjusting a size of the time window based on the determination. In the preferred embodiment of the present invention the remote unit hands off to the base station by searching for the base station within a period of time surrounding the time offset, where the period of time is equal to the adjusted time window.

The present invention additionally encompasses a method to facilitate handoff in a Code Division, Multiple Access (CDMA) communication system where base stations are time offset from each other by multiples of Pseudo Noise (PN) chips and a remote unit is given a PN offset for a base station and hands off to the base station if the remote unit can acquire a transmission of the base station within a time window surrounding the PN offset. The method comprises the steps of determining if the CDMA communication system is operating in a time synchronized or a time unsynchronized mode, adjusting a size of the time window based on the determination, and handing off to the base station by searching for the base station within a period of time surrounding the PN offset, where the period of time is equal to the adjusted time window. In the preferred embodiment of the present invention the step of determining if the communication system is operating in the unsynchronized mode comprises the steps of receiving a message indicating that the communication system is operating in the time unsynchronized mode and determining, based on the received message, if the communication system is operating in the time unsynchronized mode.

A further embodiment of the present invention encompasses an apparatus to facilitate handoff in a communication system where a remote unit is given a time offset for a base station and hands off to the base station if the remote unit can acquire the base station within a time window surrounding the time offset, the apparatus comprising a logic unit determining if the communication system is operating in one of a synchronized or an unsynchronized mode and adjusting a size of the time window based on the determination.

FIG. 1 illustrates a wireless communication system in accordance with the preferred embodiment of the present invention. In the preferred embodiment of the present invention, communication system 100 utilizes a Code Division Multiple Access (CDMA) system protocol but in alternate embodiments communication system 100 may utilize other digital cellular communication system protocols such as, but not limited to, the next-generation CDMA protocols, including direct sequence spread spectrum or slow frequency hopping spread spectrum systems. Communication system 100 includes base station 101, base station 102, remote unit 113, Centralized Base Station Controller (CBSC) 102, and Mobile Switching Center (MSC) 104. In the preferred embodiment of the present invention base stations 101 and 102 are preferably Motorola SC9600 base stations, MSC 104 is preferably a Motorola EMX2500 MSC, and CBSC 103 is preferably comprised of a Motorola SG1128BF CBSC component. As shown, remote unit 113 is communicating with base stations 101 and 102 via uplink communication signals 119 and base stations 101 and 102 are communicating with remote unit 113 via downlink communication signals 116. In the preferred embodiment of the present invention, base stations 101 and 102 are suitably coupled to CBSC 102, and CBSC 103 is suitably coupled to MSC 104.

Operation of communication system 100 occurs as follows: Once remote unit 113 is powered on, remote unit 113 accesses available pilot channels to determine a base station with a strongest pilot channel. As described in J-STD-008 section 3, multiple channels are code-division-multiplexed onto the same PN spreading code using 64 different Walsh codes. The pilot channel uses Walsh code 0, which is an all zeroes code, which leaves only the PN spreading code. The sync channel uses Walsh code 32, the paging channels may use Walsh codes 1–7, and the remaining codes of the 64 Walsh code set may be used for forward traffic channels. Base stations within communication system 100 continuously broadcast a pilot channel (via downlink communication signal 116) that is utilized by remote unit 113 in accessing communication system 100. Once remote unit 113 has determined a base station having a strongest pilot channel (in this case, base station 101), remote unit uses the timing of the pilot channel to access the sync channel to time align to base station 101. In particular, as described in J-STD-008 section 3.7, base station 101 continuously broadcasts a sync channel (via downlink communication signal 116) that is used to provide time and frame synchronization data to remote unit 113. Once remote unit 113 has decoded the information on the sync channel, according to J-STD-008 section 2.6.1.2, it will synchronize the remote unit system timing to the timing of the base station 101. In the preferred embodiment of the present invention (utilizing a CDMA system protocol), there are two types of handoff for a remote unit. A remote unit not engaged in a conversation on a traffic channel will perform the Idle Handoff procedures as described in J-STD-008, section 2.6.2.1.4 by monitoring the neighboring base station pilots and re-selecting a new base station pilot channel, decoding the sync channel, and then the paging channel. For Idle Handoff, base station 101 will provide remote unit 113 with a list of neighboring base stations along with their time offsets (PN offsets) using an Extended Neighbor List Message (2.6.2.2.7) on the paging channel. Remote unit 113 will utilize this information and acquire additional base stations to simultaneously communicate with serving base station 101 and monitor all acquired base stations.

The second type of handoff is utilized if the mobile originates or receives a call and is assigned to a Traffic Channel, after which it will begin to perform the handoff procedures of J-STD-008 section 2.6.6. The remote unit monitors other base stations by measuring their pilot strengths and reporting them to the serving base station for handoff decisions. As described in J-STD-008, remote unit 113 may be placed into simultaneous communication with more than one base station, which is termed "softer handoff" or "soft handoff" when the base stations are co-located or not, respectively. For handoffs occurring while the remote unit is on a traffic channel, base station 101 will provide a list of neighboring base stations along with their time offsets (PN offsets). Remote unit 113 will utilize this information and acquire additional base stations to simultaneously communicate with serving base station 101 and monitor all acquired base stations.

Base stations fall within several categories (or sets) defined as follows:

Active Set Base Stations: Base stations within the Active Set are those base stations that contain Forward Traffic Channels assigned to a particular remote unit.

Neighbor Set Base Stations: Base stations within the Neighbor Set are those base stations that are probable candidates for handoff for a particular remote unit Candidate Set Base Stations: Base stations within the Candidate Set are those base stations that have been received with sufficient signal strength by a remote unit to be successfully demodulated, but have not been placed in the Active Set by the base station.

Remaining Set Base Stations: Base stations within the Remaining Set are those base stations that have the allowable pilot offsets, but are not in the Active Set, Neighbor Set, or Candidate Set.

As discussed above, remote unit 113 utilizes the time offset of each base station (supplied by serving base station 101 via downlink communication signal 116) and search for neighboring base stations within the time window surrounding its PN offset. An individual base station will be acquired only if the pilot is detected within the time window surrounding its PN offset. Unlike prior-art methods of varying time windows surrounding PN offsets, in the preferred embodiment of the present invention, the time window surrounding an individual PN offset is allowed to vary depending upon whether communication system 100 is time synchronized. In particular, base station 101 supplies remote unit 113 with an indication that communication system 100 is operating in a synchronized or an unsynchronized mode, and remote unit 113 varies the time window (search window) accordingly. Because remote units acquiring base stations vary their search window based on the communication system synchronization status, remote units will search smaller time windows when handing off, resulting in faster acquisition times and consequently faster handoffs.

Figure 2:
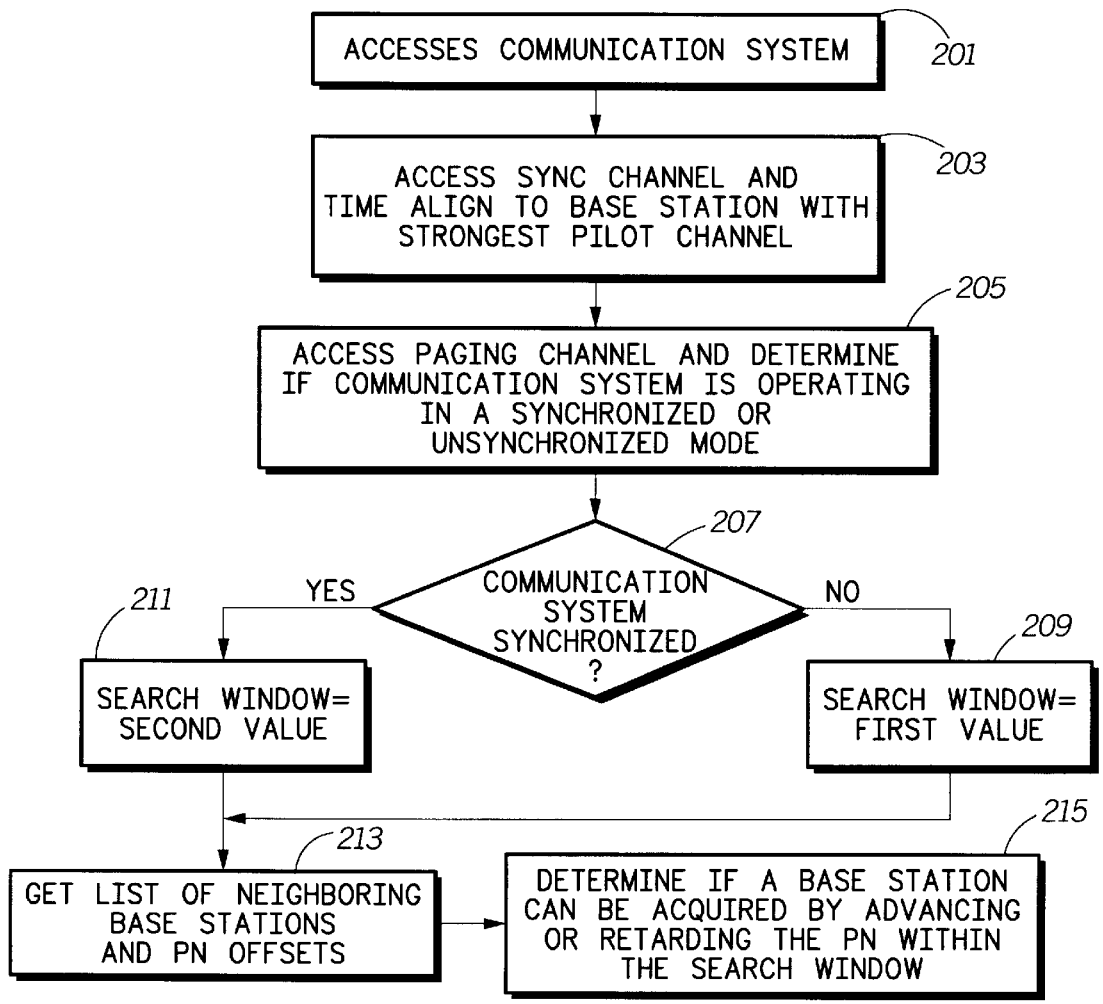
FIG. 2 is a flow chart illustrating operation of the communication system of FIG. 1 in accordance with the preferred embodiment of the present invention.

FIG. 2 is a flow chart illustrating operation of communication system 100 of FIG. 1 in accordance with the preferred embodiment of the present invention. The logic flow begins at step 201 where remote unit 113 accesses communication system 100. In particular, as described in J-STD-008 section 2.6.6.2.2, remote unit 113 utilizes a searcher element (searcher 131 and logic unit 132) to compute the strength of individual pilot channels by adding the ratios of received pilot energy per chip to total received spectral density (noise and signals), Io, of at most k usable multipath components (where k is the number of demodulating elements supported by remote unit 112). Next, at step 202, remote unit 113 accesses a sync channel transmitted by the strongest base station in order to time align with the base station having the strongest pilot channel (e.g., base station 101). In particular, remote unit 113 demodulates, de-interleaves, and decodes the 1200 bps data on the sync channel, the coding and structure of which are described in J-STD-008 section 3.1.3.2, At this point in the logic flow, remote unit 113 is time aligned to base station 101 having the strongest received pilot channel, and is ready to decode information sent to remote unit 113 by base station 101. At step 205 remote unit accesses a paging channel to determine if communication system 100 is operating in a synchronized or an unsynchronized mode. In particular, in the preferred embodiment of the present invention base station 101 continuously broadcasts a Modified System Parameters Message as described in J-STD-008 section 3.7.2.3.2.1, over the paging channel that indicates if communication system 100 is operating in a synchronized or an unsynchronized mode. In the preferred embodiment of the present invention, the Reserved bit field in the Modified System Parameters Message is redefined as a SYNC_STAT bit to indicate if the system is Synchronized or Unsynchronized. At step 207 logic unit 133 analyzes the Modified System Parameters Message and determines if communication system 100 is operating in a synchronized mode. If at step 207, logic unit 133 determines that communication system 100 is not operating in a synchronized mode, then the logic flow continues to step 209 where logic unit 133 sets a search window size to a first value (for example, 32,768 PN chips), and the logic flow continues to step 213. If at step 207, logic unit 133 determines that communication system 100 is operating in a synchronized mode, then the logic flow continues to step 211 where logic unit 133 sets a search window size to a second value (as described in J-STD-008 Section 2.6.6.2.1), and the logic flow continues to step 213. In particular, if communication system 100 is operating in a synchronized mode, then the search window is set equal to a value supplied in the System Parameters Message as described in section 2.6.6.2.1 of J-STD-008. At step 213 logic unit 133 is supplied a list of neighboring base stations along with their PN offsets. Next, at step 215 searcher 131 attempts to access the neighboring base stations by determining if a particular neighbor base station can be acquired by advancing or retarding the PN-offset throughout the search window. In particular, as described in J-STD-008 section 2.6.6.2.1., searcher 131 centers the search window for each pilot (broadcast over the pilot channel) of a particular base station around the earliest arriving usable multipath component of the pilot and attempts to acquire the pilot by correlating with the PN code at time offsets through out the specified search window which is centered on the PN-offset (supplied by base station 101).

Table 1 shows a Modified System Parameters Message in accordance with the preferred embodiment of the present invention. In the preferred embodiment of the present invention, the Modified System Parameters Message is a variable bit message broadcast to remote unit 113 over a standard paging channel and is similar to the System Parameters Message described in J-STD-008 section 3.7.2.3.2.1 except for the following field changes:

SRCH_WIN_A: Search window size for the Active Set and the Candidate Set

The base station shall set this field to the value shown in Table 2.6.6.2.1-1 of J-STD-008 corresponding to the search window size for the Active Set only if SYNC_STAT is set to "1".

SRCH_WIN_N: Search window size for the Neighbor Set.

The base station shall set this field to the value shown in Table 2.6.6.2.1-1 of J-STD-008 corresponding to the search window size for the Neighbor Set only if SYNC_STAT is set to "1".

SRCH_WIN_R:—Search window size for the Remaining Set

The base station shall set this field to the value shown in Table 2.6.6.2.1-1 of J-STD-008 corresponding to the search window size for the Remaining Set only if SYNC_STAT is set to "1".

SYNC_STAT:—Communication system synchronization status

The base station shall set this field to "1" if the communication system is operating in a synchronized mode, otherwise the base station shall set this field to "0".

| Field | Length (bits) |
|---|---|
| MSG_TYPE ('00000001') | 8 |
| PILOT_PN | 9 |
| CONFIG_MSG_SEQ | 6 |
| SID | 15 |
| NID | 16 |
| REG_ZONE | 12 |
| TOTAL_ZONES | 3 |
| ZONE_TIMER | 3 |
| MULT_SIDS | 1 |
| MULT_NIDS | 1 |
| BASE_ID | 16 |
| BASE_CLASS | 4 |
| PAGE_CHAN | 3 |
| MAX_SLOT_CYCLE_INDEX | 3 |
| HOME_REG | 1 |
| FOR_SID_REG | 1 |
| FOR_NID_REG | 1 |
| POWER_UP_REG | 1 |
| POWER_DOWN_REG | 1 |
| PARAMETER_REG | 1 |
| REG_PRD | 7 |
| BASE_LAT | 22 |

-continued

The base station shall set this field to "1" if the communication system is operating in a synchronized mode, otherwise the base station shall set this field to "0".

| Field | Length (bits) |
|---|---|
| BASE_LONG | 23 |
| REG_DIST | 11 |
| SRCH_WIN_A | 4 |
| SRCH_WIN_N | 4 |
| SRCH_WIN_R | 4 |
| NGHBR_MAX_AGE | 4 |
| PWR_REP_THRESH | 5 |
| PWR_REP_FRAMES | 4 |
| PWR_THRESH_ENABLE | 1 |
| PWR_PERIOD_ENABLE | 1 |
| PWR_REP_DELAY | 5 |
| RESCAN | 1 |
| T_ADD | 6 |
| T_DROP | 6 |
| T_COMP | 4 |
| T_TDROP | 4 |
| EXT_SYS_PARAMETER | 1 |
| EXT_NGHBR_LIST | 1 |
| GLOBAL_REDIRECT | 1 |
| SYNC_STAT | 1 |

Table 1: Modified System Parameters Message

Figure 3:
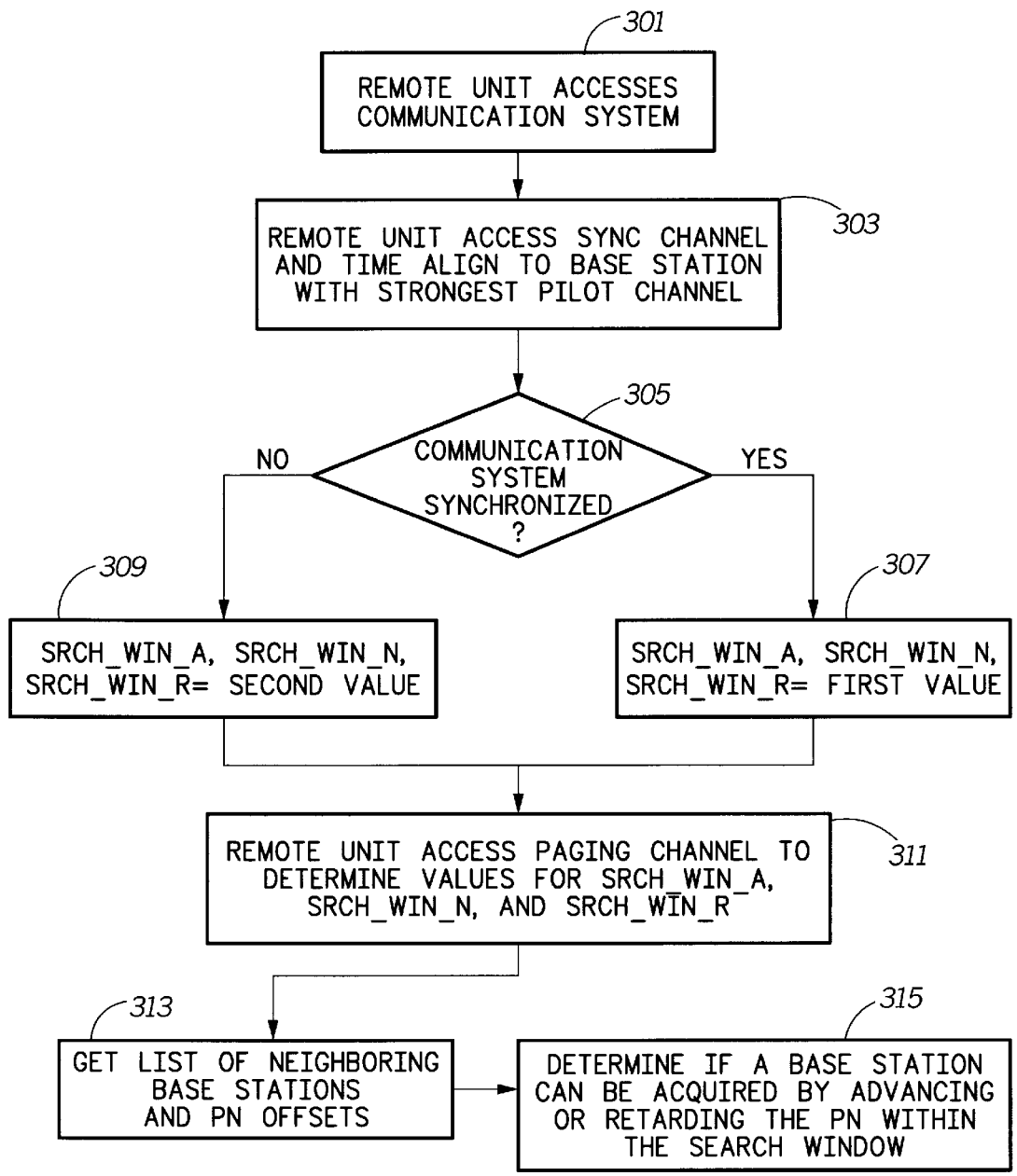
FIG. 3 is a flow chart illustrating operation of the communication system of FIG. 1 in accordance with an alternate embodiment of the present invention.

FIG. 3 is a flow chart illustrating operation of communication system 100 of FIG. 1 in accordance with an alternate embodiment of the present invention. In the alternate embodiment of the present invention the Modified System Parameters Message contains no SYNC_STAT bit. Adjustment of search windows in accordance with the alternate embodiment of the present invention occurs by base station 101 adjusting SRCH_WIN_A, SRCH_WIN_N, and SRCH_WIN_R fields based on whether communication system is operating in a synchronized or an unsynchronized mode. The logic flow begins at step 301 where remote unit 113 accesses communication system 100. As discussed above with reference to FIG. 2, remote unit 113 utilizes a searcher element to compute the strength of individual pilot channels by adding the ratios of received pilot energy per chip to total received spectral density (noise and signals), Io, of at most k usable multipath components (where k is the number of demodulating elements supported by remote unit 113). Next, at step 303, remote unit 113 accesses a sync channel transmitted by the strongest base station in order to time align with the base station having the strongest pilot channel (e.g., base station 101). At this point in the logic flow, remote unit 113 is time aligned to base station 101 having the strongest received pilot channel, and is ready to decode information sent to remote unit 113 by base station 101. At step 305 base station 101 determines if communication system 100 is operating in a synchronized or an unsynchronized mode. If at step 305, base station 101 determines that communication system 100 is operating in a synchronized mode, then the logic flow continues to step 307 where base station 101 determines first values for SRCH_WIN_A, SRCH_WIN_N, and SRCH_WIN_R. In particular, at step 307 base station 101 determines values for SRCH_WIN_A, SRCH_WIN_N, and SRCH_WIN_R as described in J-STD-008. If at step 305 base station 101 determines that communication system 100 is operating in an unsynchronized mode, then the logic flow continues to step 309 where base station 101 determines second values for SRCH_WIN_A, SRCH_WIN_N, and SRCH_WIN_R. In particular, at step 309 SRCH_WIN_A, SRCH_WIN_N, and SRCH_WIN_R are set to a very large search window size, for example, 32,768, and the logic flow continues to step 311.

At step 311 remote unit 113 accesses a paging channel to determine values for SRCH_WIN_A, SRCH_WIN_N, and SRCH_WIN_R. In particular, base station 101 continuously broadcasts a Modified System Parameters Message over the paging channel that indicates the size of the search windows (SRCH_WIN_A, SRCH_WIN_N, and SRCH_WIN_R) that remote unit 113 is to utilize when accessing neighbor base stations and remote unit 113 accesses the Modified System Parameters Message to obtain values for search window size. At step 313 remote unit 113 is supplied a list of neighboring base stations along with their PN offsets. Next, at step 315 remote unit 113 attempts to access the neighboring base stations by determining if a particular neighbor base station can be acquired by advancing or retarding the PN-offset throughout the search window. In particular, as described in J-STD-008 section 2.6.6.2.1., remote unit 113 centers the search window for each pilot of neighbor base stations around the earliest arriving usable multipath component of the pilot.

Figure 4:
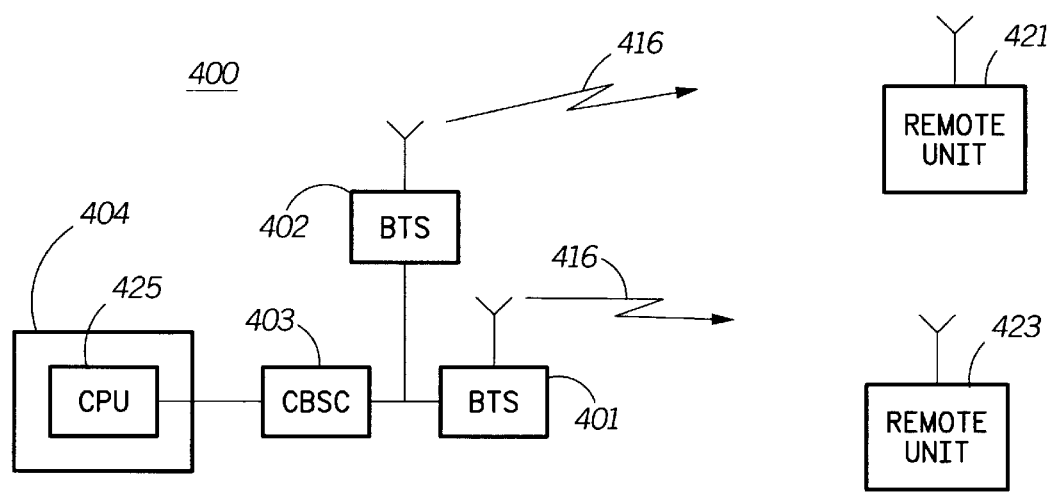
FIG. 4 illustrates a wireless communication system in accordance with an alternate embodiment of the present invention.

FIG. 4 illustrates a wireless communication system in accordance with an alternate embodiment of the present invention. In the alternate embodiment of the present invention, communication system 400 utilizes an unsynchronized Code Division Multiple Access (CDMA) system protocol. Communication system 400 includes base station 401, base station 402, remote units 421 and 423, Centralized Base Station Controller (CBSC) 402, and Mobile Switching Center (MSC) 404.

Figure 5:
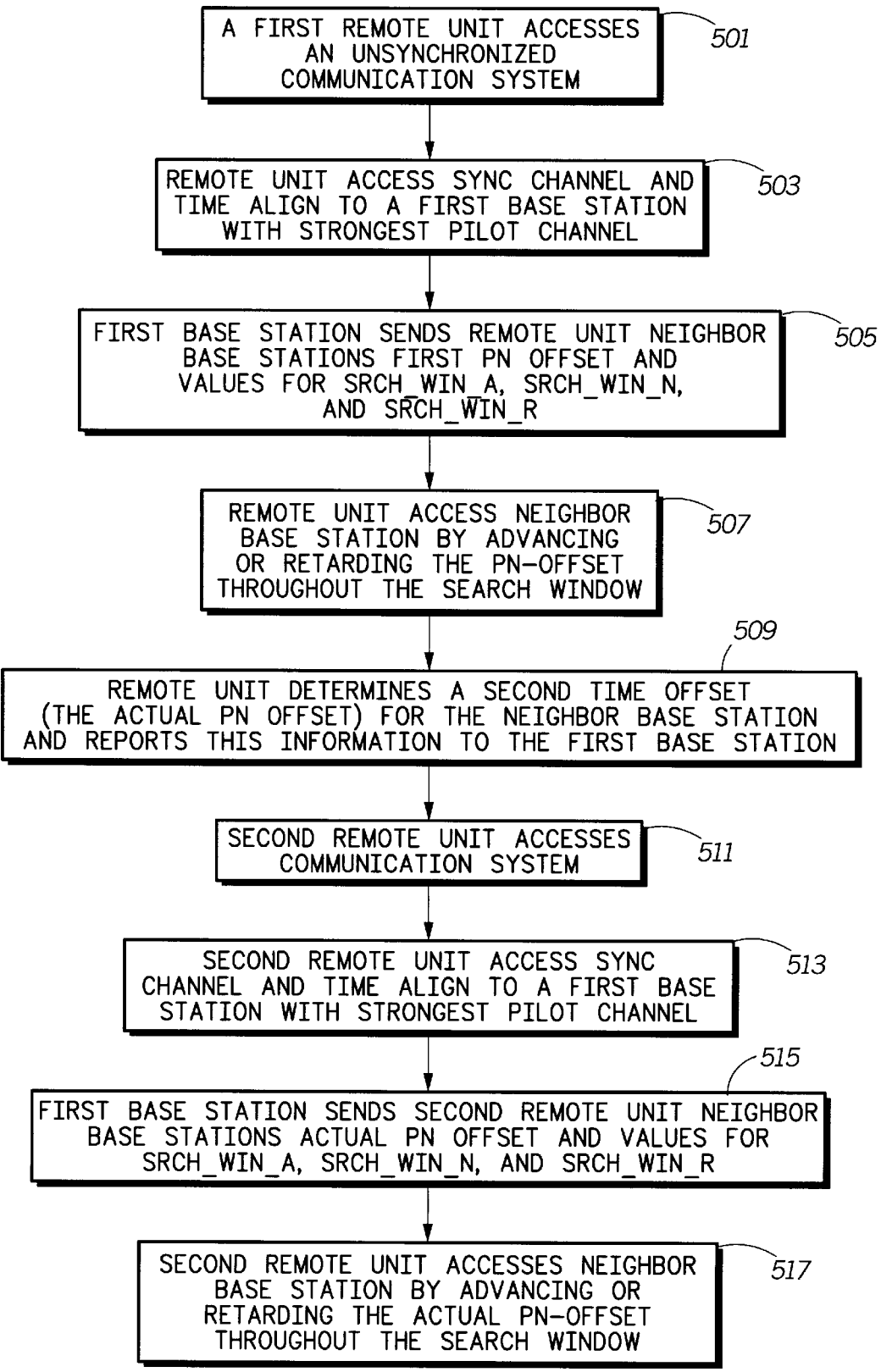
FIG. 5 is a flow chart illustrating operation of the communication system of FIG. 4 in accordance with a further alternate embodiment of the present invention.

FIG. 5 is a flow chart illustrating operation of the communication system of FIG. 4 in accordance with a further alternate embodiment of the present invention. In this embodiment of the present invention the search window is determined as described in J-STD-008 and a centralized processor located within MSC 404 tracks PN offsets for individual base stations within system 400 and reports the actual PN offset to remote units 421 and 423. Additionally, in order to properly track the PN offset for each base station within communication system 400, remote units 421 and 423 report the actual PN offset back to centralized processor 425 which continuously updates the actual PN offset for a particular base station.

The logic flow begins at step 501 where a first remote unit 423 accesses unsynchronized communication system 400. As discussed above with reference to FIG. 2, remote unit 423 utilizes a searcher element to compute the strength of individual pilot channels by adding the ratios of received pilot energy per chip to total received spectral density (noise and signals), Io, of at most k usable multipath components (where k is the number of demodulating elements supported by remote unit 113). Next, at step 502, remote unit 423 accesses a sync channel transmitted by the strongest received base station in order to time align with the base station having the strongest pilot channel (e.g., base station 401). At this point in the logic flow, remote unit 423 is time aligned to base station 401 having the strongest received pilot channel, and is ready to decode information sent to remote unit 423 by base station 401. At step 505 base station 401 sends remote unit 423 a list of neighbor base stations along with their PN offset (supplied by MSC 404) and values for SRCH_WIN_A, SRCH_WIN_N, and SRCH_WIN_R. With reference to FIG. 4, base station 401 sends remote unit 423 identification information for base station 402 and a first time offset (PN offset) for base station 402.

Continuing, at step 507, remote unit 423 accesses base station 402 by advancing or retarding the PN-offset throughout the search window. In particular, as described in J-STD-008 section 2.6.6.2.1., a searcher centers the search window for each pilot (broadcast over the pilot channel) of a particular base station around the earliest arriving usable multipath component of the pilot and attempts to acquire the pilot by correlating with the PN code at time offsets through out the specified search window which is centered on the PN-offset (supplied by base station 101). Once base station 402 has been acquired, remote unit 423 determines a second time offset (the actual PN offset) for base station 402 (step 509) and reports this information to base station 401, which in turn routes the information through CBSC 403 to MSC 404.

At step 511 a second remote unit (remote unit 421) accesses communication system 400 utilizing a searcher element to compute the strength of individual pilot. Next, at step 512, remote unit 421 accesses a sync channel transmitted by the strongest received base station in order to time align with the base station 401 having the strongest pilot channel. At this point in the logic flow, remote unit 421 is time aligned to base station 401 having the strongest received pilot channel, and is ready to decode information sent to remote unit 421 by base station 401. At step 515 base station 401 sends remote unit 421 a list of neighbor base stations along with their actual PN offset (supplied by MSC 404) and values for SRCH_WIN_A, SRCH_WIN_N, and SRCH_WIN_R. With reference to FIG. 4, base station 401 sends remote unit 421 identification information for base station 402 including the second time offset (PN offset) for base station 402. In other words, remote unit 421 is supplied the actual PN offset for base station 402 which was determined by remote unit 422.

Continuing, at step 517, remote unit 421 accesses base station 402 by advancing or retarding the second time offset (second PN-offset) throughout the search window as described in J-STD-008 section 2.6.6.2.1. Once base station 402 has been acquired, remote unit 421 determines a third time offset (the actual PN offset) for base station 402 (step 509) and reports this information to base station 401, which in turn routes the information through CBSC 403 to MSC 404.

In the alternate embodiment described with reference to FIG. 4 and FIG. 5, base stations PN offsets are allowed to drift over time due to the fact that communication system 400 is unsynchronized. By continuously updating PN offset information, remote units will search smaller time windows when handing off, resulting in faster acquisition times and consequently faster handoffs.

The descriptions of the invention, the specific details, and the drawings mentioned above, are not meant to limit the scope of the present invention. For example, the above description of the preferred embodiment provides a means for indicating whether or not a communication system is operating in a synchronized or an unsynchronized mode and means for adjusting a search window based on whether the communication system is operating in a synchronized or an unsynchronized mode. Although the means for means for indicating whether or not a communication system is operating in a synchronized or an unsynchronized mode is placed within a Modified System Parameters Message, the means for indicating may be placed in any type message transmitted from a base station without varying from the scope of the invention. It is the intent of the inventors that various modifications can be made to the present invention without varying from the spirit and scope of the invention, and it is intended that all such modifications come within the scope of the following claims.

What is claimed is:

1. A method to facilitate handoff in a communication system where a remote unit is given a time offset for a base station and hands off to the base station if the remote unit can acquire the base station within a time window surrounding the time offset, the method comprising the steps of:

determining if the communication system is operating in one of a synchronized or an unsynchronized mode; and adjusting a size of the time window based on the determination.

2. The method of claim 1 further comprising the step of handing off to the base station by searching for the base station within a period of time surrounding the time offset, wherein the period of time is equal to the adjusted time window.

3. The method of claim 2 wherein the step of determining if the communication system is operating in the synchronized or the unsynchronized mode comprises the steps of:

receiving a message indicating that the communication system is operating in the synchronized or the unsynchronized mode; and determining, based on the received message, if the communication system is operating in the synchronized or the unsynchronized mode.

4. A method to facilitate handoff in a Code Division, Multiple Access (CDMA) communication system where base stations are time offset from each other by multiples of Pseudo Noise (PN) chips and a remote unit is given a PN offset for a base station and hands off to the base station if the remote unit can acquire a transmission of the base station within a time window surrounding the PN offset, the method comprising the steps of:

determining if the CDMA communication system is operating in a time synchronized or a time unsynchronized mode;

adjusting a size of the time window based on the determination; and handing off to the base station by searching for the base station within a period of time surrounding the PN offset, wherein the period of time is equal to the adjusted time window.

5. The method of claim 4 wherein the step of determining if the communication system is operating in the unsynchronized mode comprises the steps of:

receiving a message indicating that the communication system is operating in the time unsynchronized mode; and determining, based on the received message, if the communication system is operating in the time unsynchronized mode.

6. A method to facilitate handoff in a communication system where a first and a second remote unit are given a first and a second time offset for a base station and hands off to the base station if the remote units can acquire the base station within a time window surrounding the time offsets, the method comprising the steps of:

sending the first time offset information for the base station to the first remote unit;

receiving, from the first remote unit, the second time offset for the base station, wherein the second time offset for the base station is substantially equal to a time in which the base station's time offset has drifted to from the first time offset; and sending the second time offset information for the base station to the second remote unit.

7. An apparatus to facilitate handoff in a communication system where a remote unit is given a time offset for a base station and hands off to the base station if the remote unit can acquire the base station within a time window surrounding the time offset, the apparatus comprising a logic unit adapted to determine if the communication system is operating in one of a synchronized or an unsynchronized mode, said logic unit adapted to adjust a size of the time window based on the determination.

8. The apparatus of claim 7 wherein the remote unit hands off to the base station by searching for the base station within a period of time surrounding the time offset, wherein the period of time is equal to the adjusted time window.

9. The apparatus of claim 7 wherein the communication system is a Code Division, Multiple Access (CDMA) communication system.

10. The apparatus of claim 7, wherein the logic unit determines if the communication system is operating in one of the synchronized or the unsynchronized mode by receiving a message indicating that the communication system is operating in the synchronized or the unsynchronized mode and determining, based on the received message, if the communication system is operating in the synchronized or the unsynchronized mode.

* * * * *